(12) United States Patent
Christian

(10) Patent No.: US 11,564,398 B2
(45) Date of Patent: Jan. 31, 2023

(54) SYSTEM AND METHOD FOR CLEANING A BIRD FOR CONSUMPTION

(71) Applicant: Max Leroy Christian, Stratford, TX (US)

(72) Inventor: Max Leroy Christian, Stratford, TX (US)

(*) Notice: Subject to any disclaimer, the term of this patent is extended or adjusted under 35 U.S.C. 154(b) by 0 days.

(21) Appl. No.: 17/219,861

(22) Filed: Mar. 31, 2021

(65) Prior Publication Data

US 2021/0307344 A1    Oct. 7, 2021

Related U.S. Application Data

(60) Provisional application No. 63/003,311, filed on Apr. 1, 2020.

(51) Int. Cl.
   *A22C 21/06* (2006.01)
   *A22C 21/00* (2006.01)

(52) U.S. Cl.
   CPC ........ *A22C 21/063* (2013.01); *A22C 21/0046* (2013.01); *A22C 21/06* (2013.01)

(58) Field of Classification Search
   CPC .... A22C 21/0046; A22C 21/06; A22C 21/063

USPC .................................................. 452/106, 111
See application file for complete search history.

(56) References Cited

U.S. PATENT DOCUMENTS

| | | | |
|---|---|---|---|
| 2,327,224 A | 8/1943 | Spang | |
| 3,296,654 A * | 1/1967 | Segur | A22C 17/04 452/136 |
| 3,983,601 A | 10/1976 | Verbakel | |
| 4,935,990 A | 6/1990 | Linnenbank | |
| 4,942,642 A * | 7/1990 | Fankhauser, II | A23L 13/52 452/136 |
| 5,474,491 A | 12/1995 | Koch | |
| 7,927,195 B1 | 4/2011 | Kapke et al. | |
| 8,216,031 B2 * | 7/2012 | Kleinsasser | A22B 3/086 452/52 |
| 8,628,387 B2 | 1/2014 | Wood | |
| 8,900,039 B2 | 12/2014 | Drabbels et al. | |

* cited by examiner

*Primary Examiner* — David J Parsley
(74) *Attorney, Agent, or Firm* — G. Michael Roebuck; Moster Craft PC

(57) ABSTRACT

A bird cleaning machine is provided that enables a user to cut through a body of a bird from inside out to remove internal organs and parts (breast) of a bird such as a dove. In a particular illustrative embodiment of the invention, a bird cleaning machine includes but is not limited to a vertical guide spear rod, a back spreader bar, two side blades, wing flanges, a bird holding plate, a spring and a foot lever.

8 Claims, 8 Drawing Sheets

SYSTEM AND METHOD FOR CLEANING A BIRD FOR CONSUMPTION

CROSS REFERENCE TO RELATED APPLICATION

This patent application takes priority from U.S. Provisional Patent Application Ser. No. 63/003,311 filed on Apr. 1, 2020 by Max Christian and entitled "A SYSTEM AND METHOD FOR CLEANING A DOVE", which is hereby incorporated by reference in its entirety.

BACKGROUND OF THE INVENTION

Birds such as doves are typically cleaned for consumption by hand.

FIELD OF THE INVENTION

The invention is in the field of mechanically cleaning birds for consumption.

SUMMARY OF THE INVENTION

In a particular illustrative embodiment of the invention, a bird cleaning apparatus is disclosed that enables a user to cut through a body of a bird from inside out to facilitate remove internal organs and parts (breast) of a bird such as a dove. In a particular illustrative embodiment of the invention, a bird cleaning machine includes but is not limited to a vertical guide spear rod, a back spreader bar, two side blades, wing flanges, a bird holding plate, a spring and a foot lever. The vertical guide spear rod is positioned and affixed in a center of the bird holding plate. The two side blades and spreader bar are configured to move within slots formed in the bird holding plate. The back spreader moves away from a center position and pulls the body away from the breast. The two side blades move away from a center position are to cut the bird's body from inside-out. The bird holding plate is configured with two attached flanges at outside of the blades configured hold the wings of the bird apart on the bird holding plate.

BRIEF DESCRIPTION OF THE DRAWINGS

The drawings presented herein are for illustrative purposes only and do not limit the scope of the claims. Rather, the drawings are intended to help enable one having ordinary skill in the art to make and use the claimed inventions.

DETAILED DESCRIPTION OF THE INVENTION

Figure 1:
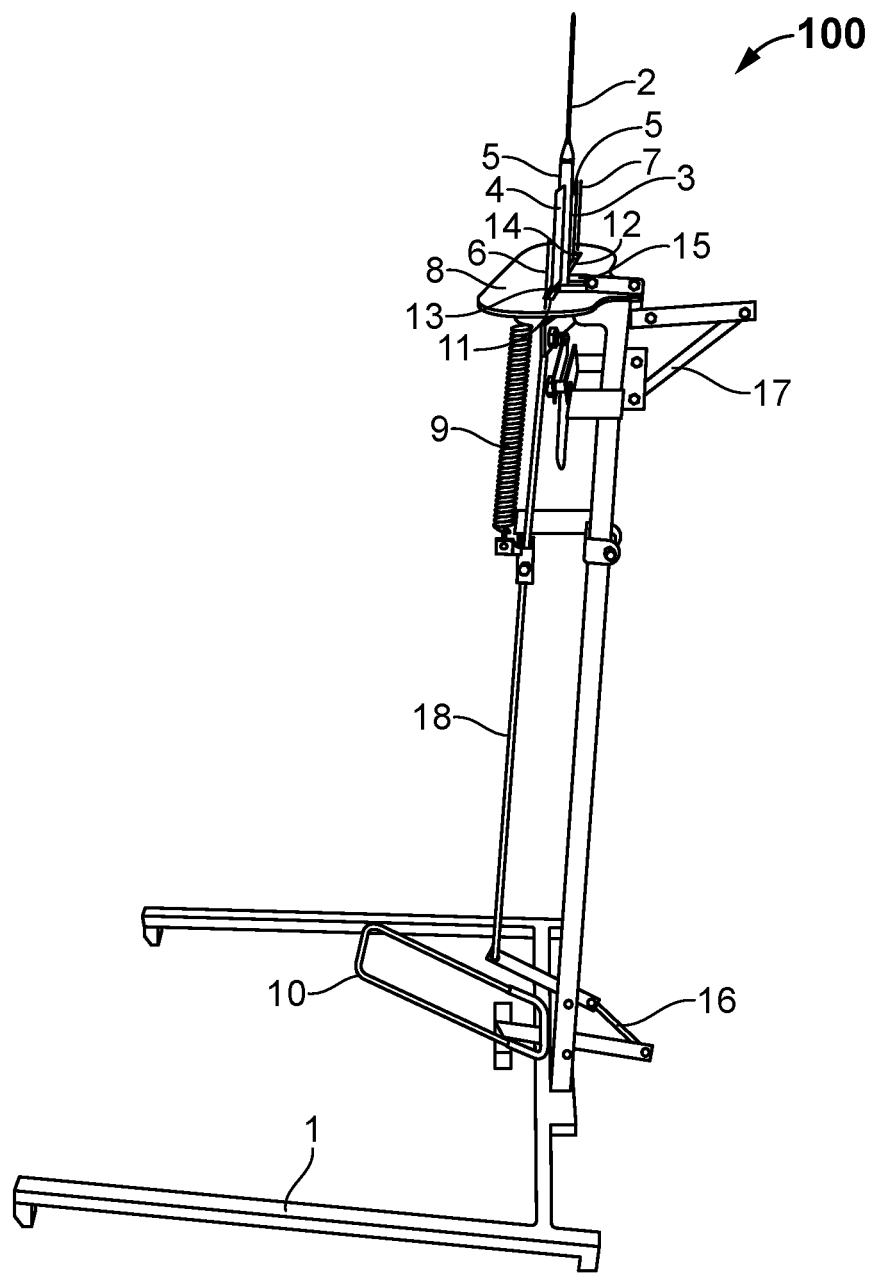
FIG. 1 is a side view depiction of an illustrative embodiment of the invention.

A detailed description will now be provided. The purpose of this detailed description, which includes the drawings, is to satisfy the statutory requirements of 35 U.S.C. § 112. For example, the detailed description includes a description of inventions defined by the claims and sufficient information that would enable a person having ordinary skill in the art to make and use the inventions. In the figures, like elements are generally indicated by like reference numerals regardless of the view or figure in which the elements appear. The figures are intended to assist the description and to provide a visual representation of certain aspects of the subject matter described herein. The figures are not all necessarily drawn to scale, nor do they show all the structural details nor do they limit the scope of the claims.

In a particular illustrative embodiment of the invention, a bird cleaning apparatus is disclosed that is configured to facilitate a to cut a bird from inside out to enable the user to remove internal organs and parts (breast) of a bird such as a dove for consumption. In a particular illustrative embodiment of the invention, a dove cleaning machine includes but is not limited to a frame, a vertical guide spear rod, a back spreader bar, two side blades, two wing flanges, a bird holding plate, a spring and a foot lever. The vertical guide spear rod is attached in middle of the bird holding plate on the top side of the bird holding plate. The two side blades and spreader bar are arranged in triangle when in a center position on the bird holding plate. The back spreader bar is configured to pull the body of the bird away from the breast. The two side blades are configured to cut through the bird's body from inside-out. The bird holding plate has two flanges attached to the top of the bird holding plate configured to hold the wings of the bird apart and outside of the two blades.

When a dove or another bird is prepared for consumption using the present invention, the operator slides a bird's body headfirst and downward, over the two side blades, the back spreader bar and vertical spear guide until the bird's body is in contact with the bird holding plate when the apparatus is in the "at rest" center position. The two bird's body is forced headfirst over the vertical spear guide, the side blades and the back spreader bar. The vertical spear rod protrudes out from the bottom end of the bird's body. The two blades and the back spreader bar remain inside of the bird's body.

When the foot lever is depressed, the bird's body on the vertical guide spear rod, the two side blades and the back spreader bar slide outward to cut through the bird's body until the bird's body is cut open, exposing the bird's internal organs for cleaning and consumption. When the foot lever is pushed downward, then the back spreader bar moves outward from the center position inside of the bird's body along the spreader bar slot and pulls the bird's body away from the breast and two blades move outward and downward within the blade slots to cut through the bird's body from inside-out of the bird's body.

Turning now to FIG. 1, in a particular illustrative embodiment, as shown in FIG. 1, a dove cleaning machine includes but is not limited to a frame 1, a vertical guide spear rod 2, a back spreader bar 3, two side blades 4 and 5, wing flanges 6 and 7, a bird holding plate 8, a spring 9 and a foot lever 10. The vertical guide spear rod is placed in middle of the bird holding plate. The two side blades and spreader bar are arranged in triangle and attached to the upper linkage 17 and protrude upward through slots 13, 14 and 15 in the bird holding plate and adjacent the vertical guide spear rod when at rest. The back spreader bar is used to pull the body away from the breast during cutting by the two blade when the foot lever is depressed. The two side blades are used to cut the bird's body from inside-out. The bird holding plate has two flanges 11 and 12 attached to the bird holding plate at outside of the blades which hold the wings of the bird apart.

The two side blades and the back spreader bar travel sideways and outward from the center of the bird holding plate within the slots when actuated by the upper linkage when the foot lever is depressed. When at rest and the foot lever is not forced down by the weight of a user's foot, the spring raises the foot lever off the floor and moves the upper linkage upward and forces the two side blades and the back spreader bar together and into the center of the bird holding plate adjacent the vertical spear guide.

When the foot lever is depressed, the upper linkage forces the two side blades and the back spreader bar slide outward from center position along and within the slots 13, 14 and 15. In a particular illustrative embodiment, the slots include but are not limited to two blade slots 13 and 14 and a back holding plate slot 15. The two blade slots are oriented parallel to each other and extend radially outward in opposing parallel directions from the center of the bird holding plate through the two blade slots. The back spreader bar slot extends radially outward and perpendicular to the two blade slots through the third slot 15.

The lower linkage 16 and upper linkage 17 are actuated by depressing the foot lever for extending and retracting two side blades and the back spreader bar slide away from the center position and the vertical spear guide. The spring retracts and returns the two side blades and the back spreader bar slide back into the center position adjacent the vertical spear guide, when the operator releases the foot lever. The vertical guide spear rod is located in the center of the bird holding plate wherein the two side blades and the back spreader bar slide and the vertical spear rod are forced together by the spring into the center of the bird holding plate when the foot lever is not depressed and at rest.

The top of the vertical guide spear, the two side blades and the back spreader bar slide are pointed to facilitate sliding the bird's body 25 head down (headfirst) downward over the vertical guide spear, the two side blades and the back spreader bar slide.

The foot lever is connected to a lower linkage, a connecting rod and an upper linkage. The upper linkage is attached to the two side blades and the back spreader bar. A spring is attached to the connecting rod 18 to force the linkage upward to an at rest position and bring the two side blades and back spreader bar together to a center position in the middle the bird spreader plate and adjacent the bird guide spear. The two side blades and the back spreader bar protrude three slots in the bird holding plate from underneath the bird holding plate and extend upward above the bird holding plate through the three slots.

Figure 2:
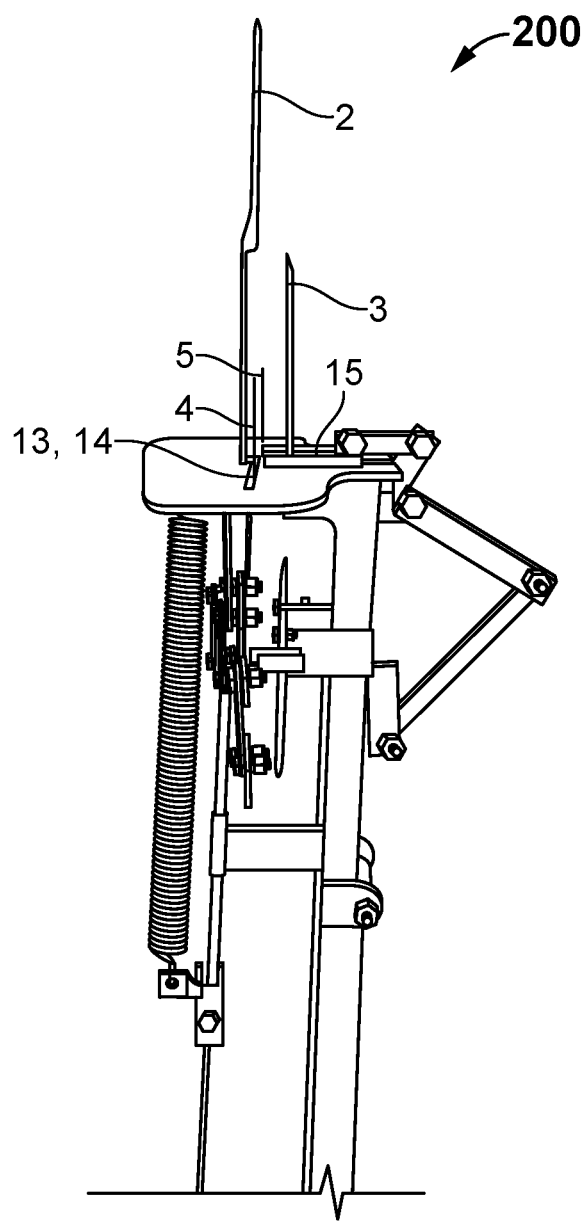
FIG. 2 is a side view depiction of an illustrative embodiment of the invention.

FIG. 2 is a side view depiction of an illustrative embodiment of the invention.

Figure 3:
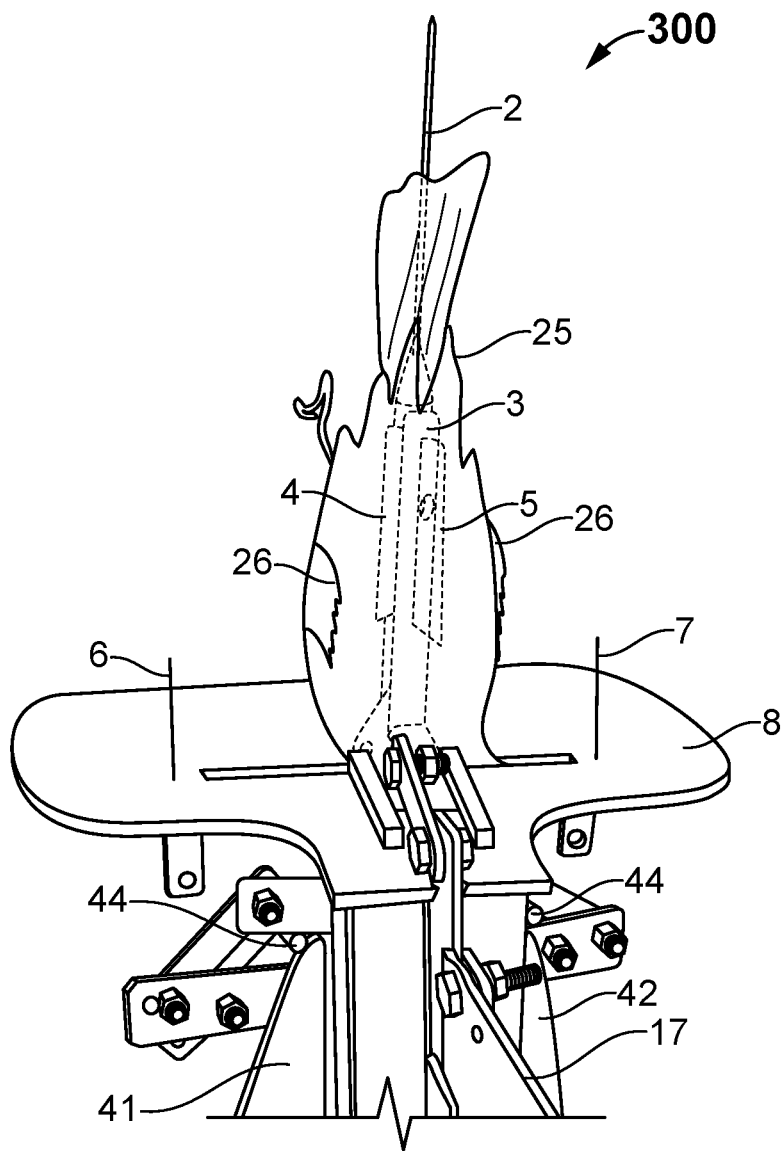
FIG. 3 is a side view depiction of an illustrative embodiment of the invention.

FIG. 3 is a side view depiction of an illustrative embodiment of the invention. As shown in FIG. 3, spreader rods 44 are attached to blade 4 and 5. The spreader rods 44 slide downward along spreader plates 41 and 42 so that blades separate and move downward when the foot lever is depress activating the upper linkage to move the blades 4 and 5 radially out from the center position and downward to cut the bird body 25 slide onto the knife blades, spreader bar and guiding rod in the at rest position.

Figure 3A:
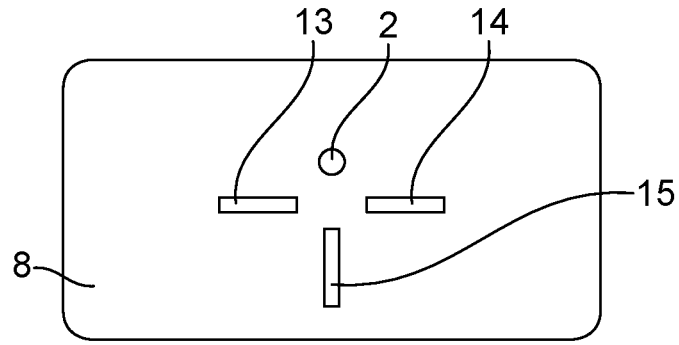
FIG. 3A is a top view depiction of an illustrative embodiment of the invention.

FIG. 3A is a top view depiction of an illustrative embodiment of the invention showing a top view of the bird plate with slots 13, 14 and 15.

Figure 4:
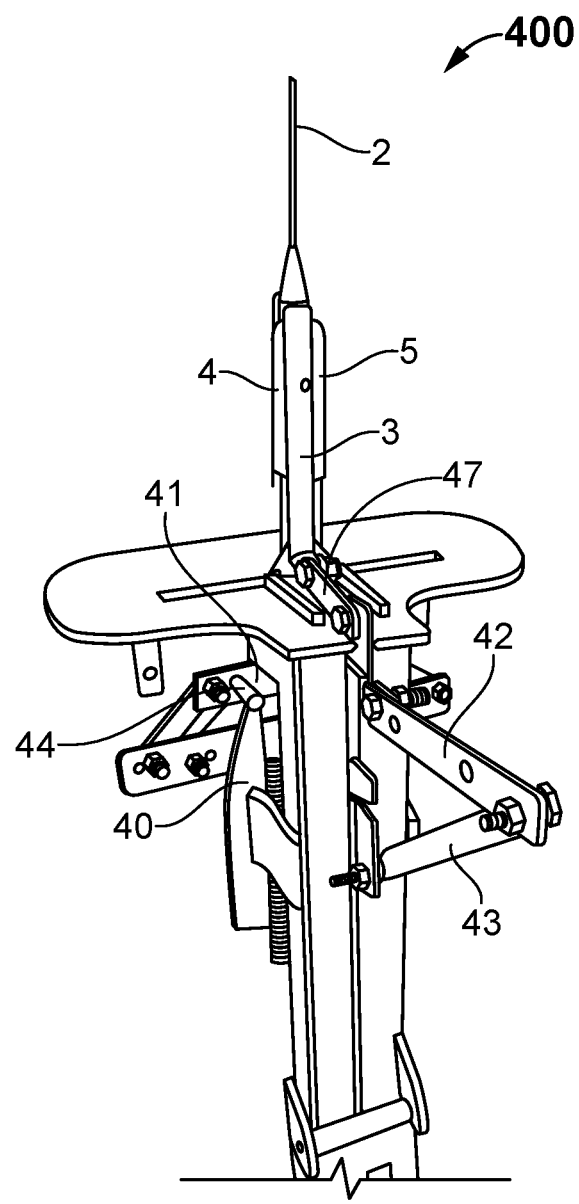
FIG. 4 is a side view depiction of an illustrative embodiment of the invention.

FIG. 4 is a side view depiction of an illustrative embodiment of the invention in the center at rest position, showing the spreader rods 44 attached to a knife bar 41 in the at rest position where the spreader rods are above the spreader guides allowing the blades and spreader bars to return to the at rest position under the influence of the spring and the upper linkage when the foot lever is not depressed.

Figure 5:
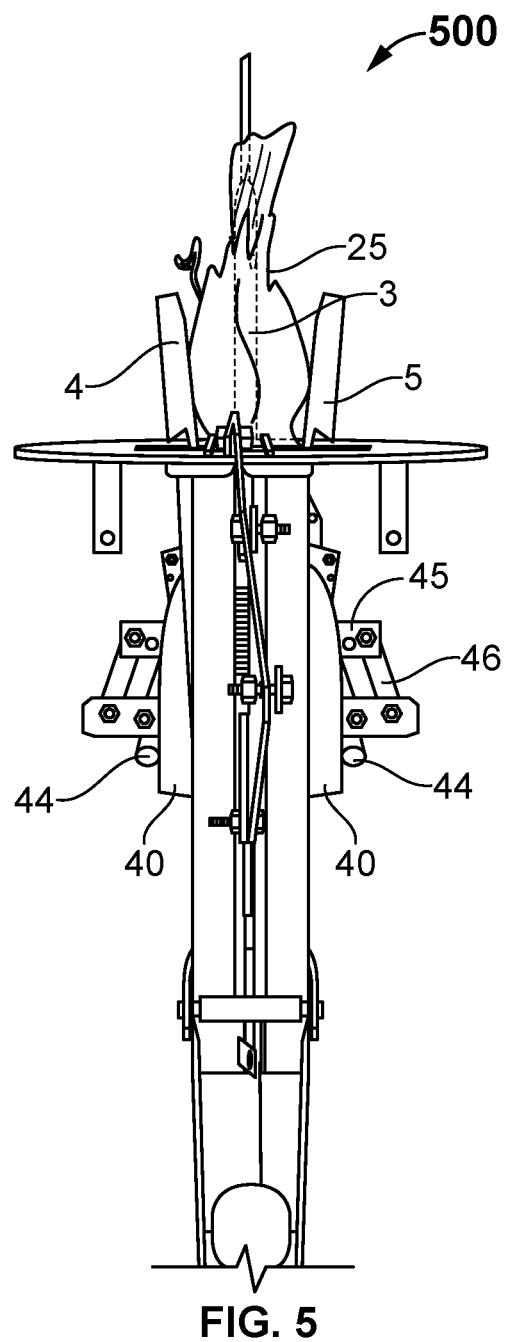
FIG. 5 is a side view depiction of an illustrative embodiment of the invention.

FIG. 5 is a side view depiction of an illustrative embodiment of the invention showing a bird body 25 after being cut through from the inside out by the knife blades. As the upper linkage pulls a knife bar attached to the knife blade 4 and 5 downward, the spreader guides 40 and cause the knife spreader rods 44 to move away from the center position as the spreader guides width increases as the spreader rods move down the spreader guide and the knife blades 4 and 5 to separate and move downward to cut through the bird body after the foot lever is depressed at center, from an at rest position. The spreader bar 3 moves away from the center position and moves the birds breast outward from the knife blades in the center position during cutting of the bird body by the knife blades 4 and 5.

Figure 6:
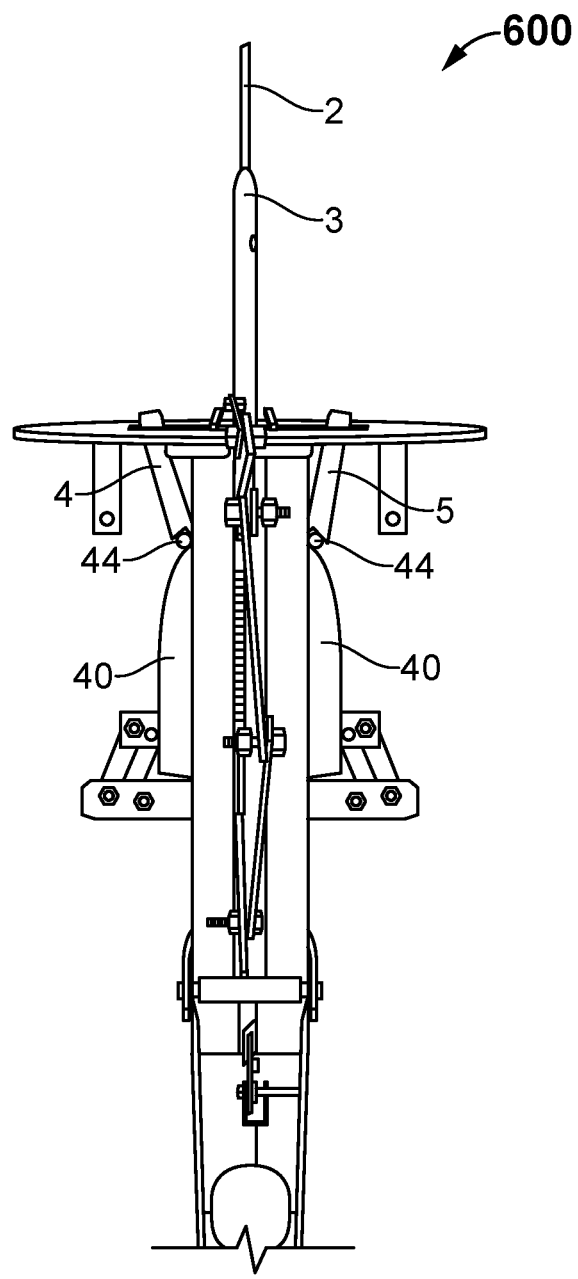
FIG. 6 is a side view depiction of an illustrative embodiment of the invention.

FIG. 6 is a side view depiction of an illustrative embodiment of the invention in the at center, at rest position showing the spreader rods attached to knife blade bar above the spreader guides 40.

Figure 7:
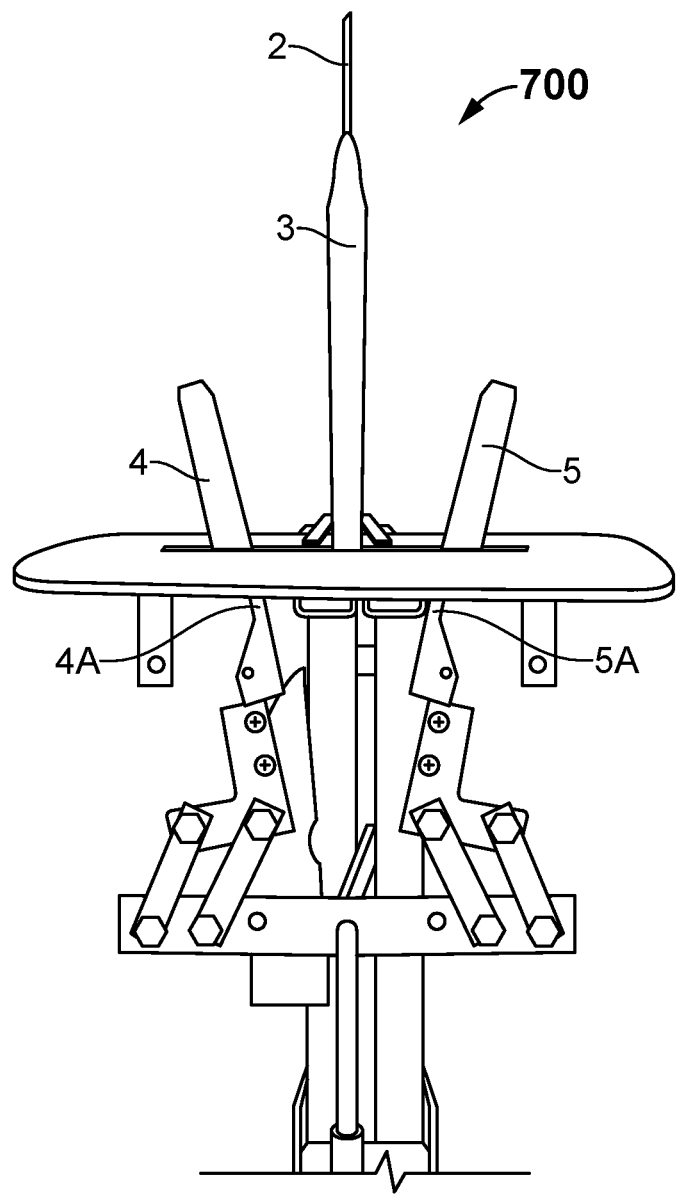
FIG. 7 is a side view depiction of an illustrative embodiment of the invention.
Figure 8:
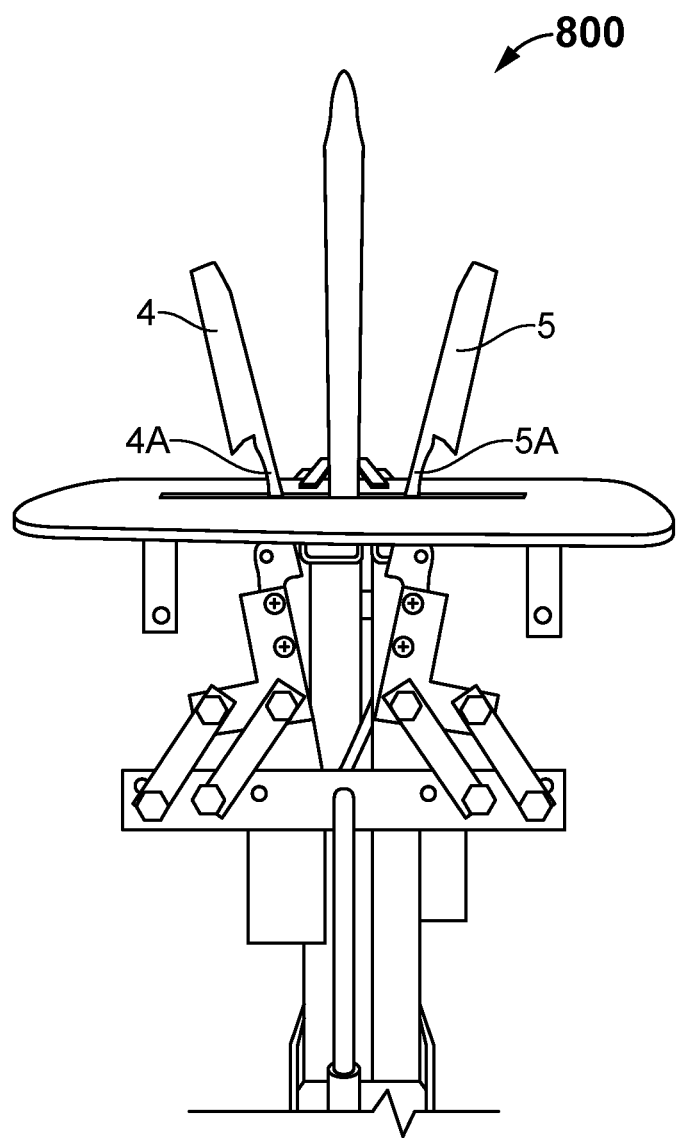
FIG. 8 is a side view depiction of an illustrative embodiment of the invention.

FIG. 7 is a side view depiction of an illustrative embodiment of the invention showing the knife blade shaft 4A and 5A of knife blades 4 and 5 moved downward below the bird holding plate when the foot lever is depressed; and FIG. 8 is a side view depiction of an illustrative embodiment of the invention showing the knife blade shaft 4A and 5A of knife blades 4 and 5 moved downward above the bird holding plate when the foot lever is depressed.

In a particular illustrative embodiment of the invention, a bird cleaning apparatus is disclosed that enables a user to remove internal organs a bird, the bird cleaning apparatus including but not limited to a frame supporting the bird cleaning apparatus; a foot lever pivotally attached the frame; a bird holding plate attached to the frame; a vertical guide spear rod attached to the bird holding plate; a back spreader bar slot and two side blade slots formed in the bird holding plate; a back spreader bar and two side blades, wherein the back spreader bar and the two side blades protrude through the back spreader bar slot and two side blade slots formed in the bird holding plate; a linkage attached to the back spreader bar and two side blade; and a foot lever attached to the linkage, wherein the foot lever is configured so that downward movement of the foot lever bar moves the linkage downward causing the linkage to move the two side blades and the back spreader bar slot and two side blade within the slots formed in the bird holding plate and away from a center position to cut through a bird body that has been slid head first onto and over the vertical guide spear, the two side blades and the back bar and two side blade slots formed in the bird holding plate.

In another particular illustrative embodiment of the invention the apparatus has two flanges attached to a top of the bird holding plate and outside of the two blade slots configured to hold a pair wings attached to the of the body of the bird. In another particular illustrative embodiment of the invention the apparatus the linkage further includes but is not limited to an upper linkage and a bottom linkage. In another particular illustrative embodiment of the invention the apparatus has a lower linkage is attached to the foot lever and configured to pull down a connection rod from an at rest position when the foot lever is depressed by a user's foot. In another particular illustrative embodiment of the invention the apparatus has a spring configured to return the connection rod to return to the at rest position. In another particular illustrative embodiment of the invention the apparatus the upper linkage is configured to move the back spreader bar within the back spreader bar slot and the two side blades within the two side blade slots formed in the bird holding plate. In another particular illustrative embodiment of the invention the apparatus an upper linkage is configured to move the two side blades outward from the center position and downward in the two side blade slots. In another particular illustrative embodiment of the invention the apparatus has a knife blade shaft attached to each of the knife blades; a spreader rod attached to the knife blade shaft; and a spreader guide attached to the frame, wherein the spreader guide is configured to spread the knife blades the spreader rod for each knife blade shaft traverses the spreader guides when the foot lever is depressed.

Each of the appended claims defines a separate invention which, for infringement purposes, is recognized as including equivalents of the various elements or limitations specified in the claims. Depending on the context, all references below to the "invention" may in some cases refer to certain specific embodiments only. In other cases, it will be recognized that references to the "invention" will refer to the subject matter recited in one or more, but not necessarily all, of the claims. Each of the inventions will now be described in greater detail below, including specific embodiments, versions, and examples, but the inventions are not limited to these specific embodiments, versions, or examples, which are included to enable a person having ordinary skill in the art to make and use the inventions when the information in this patent is combined with available information and technology. Various terms as used herein are defined below, and the definitions should be adopted when construing the claims that include those terms, except to the extent a different meaning is given within the specification or in express representations to the Patent and Trademark Office (PTO). To the extent a term used in a claim is not defined below or in representations to the PTO, it should be given the broadest definition persons having skill in the art have given that term as reflected in at least one printed publication, dictionary, or issued patent.

Certain specific embodiments of methods, structures, elements, and parts are described below, which are by no means an exclusive description of the inventions. Other specific embodiments, including those referenced in the drawings, are encompassed by this application and any patent that issues therefrom.

The invention claimed is:

1. A bird cleaning apparatus that enables a user to remove internal organs a bird, the bird cleaning apparatus comprising:
    a frame supporting the bird cleaning apparatus;
    a foot lever pivotally attached the frame;
    a bird holding plate attached to the frame;
    a vertical guide spear rod attached to the bird holding plate;
    a back spreader bar slot and two side blade slots formed in the bird holding plate;
    a back spreader bar and two side blades, wherein the back spreader bar and the two side blades protrude into and through the back spreader bar slot and two side blade slots formed in the bird holding plate;
    a linkage attached to the back spreader bar and two side blades; and
    wherein the foot lever is configured so that downward movement of a foot lever bar moves the linkage downward causing the linkage to move the two side blades and the back spreader bar slot moving the bird holding plate and two side blades within the slots formed in the bird holding plate and away from a center position to cut through a bird body that is slid head first onto and over the vertical guide spear rod with the two side blades and back spreader bar each extending into the bird body.

2. The apparatus of claim 1, further comprising:
    two flanges attached to a top of the bird holding plate and outside of the two blade slots configured to hold a pair of wings attached to the of the body of the bird.

3. The apparatus of claim 1, the linkage further comprising an upper linkage and a lower linkage.

4. The apparatus of claim 3, wherein the lower linkage is attached to the foot lever and configured to pull down a connection rod from an at rest position when the foot lever is depressed by a user's foot.

5. The apparatus of claim 4, wherein a spring is configured to return the connection rod to return to the at rest position.

6. The apparatus of claim 4, wherein the upper linkage is configured to move the back spreader bar within the back spreader bar slot and the two side blades within the two side blade slots formed in the bird holding plate.

7. The apparatus of claim 6, where the upper linkage is configured to move the two side blades outward from the center position and downward in the two side blade slots.

8. The apparatus of claim 1, the apparatus further comprising:
    a knife blade shaft attached to each of the side blades;
    a spreader rod attached to the knife blade shaft; and
    a spreader guide attached to the frame, wherein the spreader guide is configured to spread the knife blades the spreader rod for each knife blade shaft traverses the spreader guides when the foot lever is depressed.

* * * * *